United States Patent

Miyazaki et al.

[11] Patent Number: 5,867,779
[45] Date of Patent: Feb. 2, 1999

[54] PAGING EQUIPMENT AND METHOD FOR REDUCING TRAFFIC IN A MOBILE DATA COMMUNICATION SYSTEM

[75] Inventors: Akitoshi Miyazaki, Tokorozawa; Shoichi Hirata, Higashiyamato; Ichiro Okajima; Noriko Uchida, both of Yokohama, all of Japan

[73] Assignee: NTT Mobile Communications Network, Inc., Japan

[21] Appl. No.: 702,504
[22] PCT Filed: Dec. 28, 1995
[86] PCT No.: PCT/JP95/02754
  § 371 Date: Sep. 4, 1996
  § 102(e) Date: Sep. 4, 1996
[87] PCT Pub. No.: WO96/21331
  PCT Pub. Date: Jul. 11, 1996

[30] Foreign Application Priority Data

Jan. 5, 1995 [JP] Japan ................................... 7-000393

[51] Int. Cl.[6] ............................................ H04Q 7/00
[52] U.S. Cl. ........................ 455/38.1; 455/458; 455/557
[58] Field of Search ................................... 455/426, 458, 455/517, 515, 556, 557, 552, 38.1

[56] References Cited

U.S. PATENT DOCUMENTS 5,121,391  6/1992  Panneth et al. .
5,129,097  7/1992  Suzuki et al. ............................. 455/458
5,153,903  10/1992  Eastmond et al. ...................... 455/458
5,175,758  12/1992  Levanto et al. ......................... 455/458
5,487,175  1/1996  Baycey et al. ........................... 455/557
5,581,593  12/1996  Engelke et al. .......................... 455/556

FOREIGN PATENT DOCUMENTS 63-182938  7/1988  Japan .
7-307975  11/1995  Japan .

*Primary Examiner*—Edward F. Urban
*Attorney, Agent, or Firm*—Rogers & Wells LLP

[57] ABSTRACT

The communication terminal (102) is provided with a notice unit (204) for recognizing a state of use of itself and states of use of the data terminals (103$_1$) through (103$_n$) and notifying a result of the recognition to the network side, whereas the network system (101) is provided with a storage unit (303) for registering a communication terminal in which the communication terminal (102) and at least one of the data terminal (103$_1$) through (103$_n$) became usable and deleting the registration of the communication terminal (102) or a communication terminal in which the data terminals (103$_1$) through (103$_n$) became unusable, in accordance with a result of the notice made by the notice unit (204), so that a receiving possible state of the communication terminal (102) is preliminarily registered on the side of the network system (101). Moreover, the receiving standby state is discriminated between a voice-only standby state and a voice and packet simultaneous standby state. When the standby state appears to be the former, a voice paging is made and when the latter, a packet paging is made, both by the communication unit (301).

4 Claims, 4 Drawing Sheets

STATE 0: POWER SUPPLY OFF-STATE
STATE 1: VOICE STANDBY STATE
STATE 2: VOICE AND PACKET SIMULTANEOUS STANDBY STATE
STATE 3: VOICE COMMUNICATION ON-STATE
STATE 4: PACKET COMMUNICATION ON-STATE
STATE 5: POWER SAVING STATE

FIG. 4

| COMMUNICATION TERMINAL (MOBILE EQUIPMENT) STATE | STATE a<br>POWER SUPPLY ON | STATE b<br>POWER SUPPLY ON | STATE c<br>POWER SUPPLY OFF | STATE d<br>POWER SUPPLY OFF |
|---|---|---|---|---|
| DATA TERMINAL STATE | POWER SUPPLY ON | POWER SUPPLY OFF | POWER SUPPLY ON | POWER SUPPLY OFF |
| REGISTER STATE IN NETWORK SYSTEM | ○ | × | × | × |
| SIMULTANEOUS CALLING ACCORDING TO THIS EMBODIMENT | ○ | × | × | × |
| SIMULTANEOUS CALLING ACCORDING TO PRIOR ART | ○ | ○ ←※ | × | × |

PAGING EQUIPMENT AND METHOD FOR REDUCING TRAFFIC IN A MOBILE DATA COMMUNICATION SYSTEM

1. Technical Field

This invention relates to a paging equipment and a paging method in a mobile data communication system capable of reducing invalid traffics when a paging is made in a mobile data communication system in which a communication terminal is connected with a data terminal for performing a data communication.

2. Background Art

Heretofore, in case a communication terminal is connected with a data terminal for performing a data communication in a mobile data communication system, a network performs a paging as long as the communication terminal is in a receiving possible state without recognizing a receiving impossible state of the data terminal. Also, the network side performs a paging as long as the communication terminal is in a voice standby possible state irrespective of whether or not a data communication is performed.

For this reason, unnecessary calling or paging is performed and as a consequence, traffics are unfavorably increased.

DISCLOSURE OF THE INVENTION

The present invention has been accomplished in view of the above-mentioned problems. It is, therefore, an object of the present invention to provide a paging equipment in a mobile data communication network, in which a paging is performed only when both communication terminal and data terminal are in usable states and when allowance of a packet communication is recognized by the network side, thus enabling to reduce invalid traffics.

In order to resolve the above-mentioned problem, first, according to the present invention, there is provided in a mobile data communication system in which a movable communication terminal is connected with at least one data terminal and in which a state of use of the communication terminal is independent of a state of use of the data terminal, a paging equipment in a mobile data communication system being characterized by, the communication terminal comprising:

notice means for recognizing a state of use of the communication terminal itself and a state of use of at least one data terminal and notifying a result of the recognition to a network side, the network comprising:

register means for registering the communication terminal in case the communication terminal and at least one data terminal connected to the communication terminal became usable, and deleting registration of the communication terminal in case the communication terminal or all data terminals connected to the communication terminal became unusable, in accordance with a result of the notice made by the notice means, a packet paging being executed with respect to the communication terminal registered by the register means, when a packet is received.

According to this construction, when the communication terminal itself became usable and at least one of the data terminals connected to the communication terminal became usable, this communication terminal is registered by the register means on the network side. On the other hand, when the communication terminal itself became unusable or all the data terminals connected to the communication terminal became unusable, the registration is deleted. That is, only a communication terminal, which can effectively transmit and receive data, is registered by the register means. By performing a paging with respect to only the communication terminal thus registered, invalid paging can be suppressed. Accordingly, traffics can be obtained to that extent.

Secondly, according to the present invention, there is provided in a mobile data communication system in which a communication terminal can simultaneously be standby for a voice communication and a packet communication, a paging equipment in a mobile data communication system being characterized by, a network comprising:

recognizing means capable of discriminatively recognizing between a voice-only standby state and a simultaneous standby state of voice and packet as a state of the communication terminal; and call means for performing a paging with respect to a communication terminal which is in a simultaneous standby state for voice and packet when the packet is received.

According to this construction, the state of a communication terminal is discriminatively recognized between a voice-only standby state and a voice and packet receiving simultaneous standby state, so that a paging is not performed merely based on the voice-only standby state when a packet is received. Accordingly, invalid paging is not performed. Thus, traffics can be obtained to that extent.

Third, according to the present invention, there is provided in a mobile data communication system in which a communication terminal can simultaneously be standby for a voice communication and a packet communication, a paging equipment in a mobile data communication system being characterized by, a network comprising:

recognizing means capable of discriminatively recognizing between a voice-only standby state and a simultaneous standby state of voice and packet as a state of the communication terminal; and call means for performing a voice paging with respect to a communication terminal which is in a simultaneous standby state for voice-only when the voice is received.

According to this construction, it is designed such that the state of a communication terminal is discriminatively recognized between a voice-only standby state and a voice and packet receiving simultaneous standby state, so that paging is performed with respect to only the communication terminal which is in the voice-only standby state. Accordingly, invalid paging is not performed. Thus, traffics can be obtained to that extent.

BRIEF DESCRIPTION OF DRAWINGS

FIG. 4 is a diagram showing a packet communication possible state in comparison between this embodiment and the prior art.

BEST MODE FOR CARRYING OUT THE INVENTION

Figure 1:
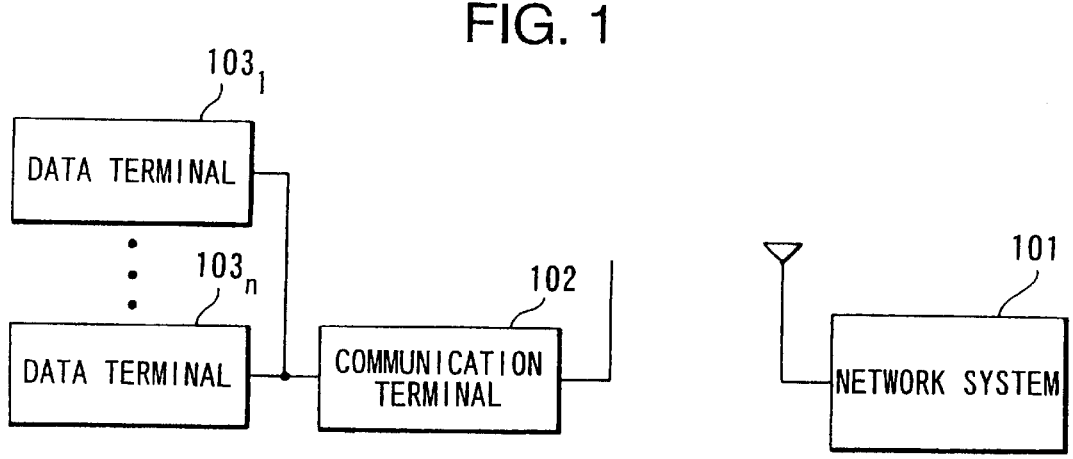
FIG. 1 is a block diagram showing an overall construction of a communication system according to one mode for carrying out the present invention.

A best mode for carrying out the present invention will now be described with reference to the drawings. FIG. 1 is a block diagram showing an overall construction of a communication system in this embodiment. In this illustration, reference numeral 101 denotes a network system having a plurality of switching nodes, in which data communication is performed in a packet mode. Reference numeral 102 denotes a movable communication terminal having a data communication function and reference numerals $103_1$ through $103_n$ respectively denote data terminals which can process data by themselves, such as personal computers. In this illustration, only one communication terminal 102 is shown for the sake of convenience of explanation but usually there are a plurality of communication terminals 102.

Here, the communication terminal 102 will be described in detail with reference to FIG. 2A. In this illustration, reference numeral $201_1$ denotes a notice unit for notifying of a usable state of itself data terminal $103_1$ to the communication terminal 102. Although not shown, communication unit $201_2$ through $201_n$ are disposed in such a manner as to correspond to respective data terminals $103_2$ through $103_n$ and adapted to notify of a usable state of a specific data terminal to the communication terminal 102.

Reference numeral 202 denotes a storage unit for storing usable states of the data terminals $103_1$ through $103_n$; 203, a system control unit for recognizing that the communication terminal 102 itself is in a usable state; and 204, a notice unit for performing a state notice to the network system 101 side at every predetermined cycle basis in case at least one of the data terminals $103_1$ through $103_n$ is in a usable state and in case the communication terminal 102 is in a usable state, respectively.

Subsequently, the network system 101 side will now be described in detail with reference to FIG. 2B. In this illustration, reference numeral 301 denotes a communication unit for receiving a state notice from the communication terminal 102 side and performing a paging with respect to the communication terminals 102 now under its control; 302, a system control unit for discriminatively recognizing a state of the communication terminal 102 between a standby state for voice-only and a paging standby state for both voice and packet; and 303, a storage unit for storing (registering) a usable state of the communication terminal 102, respectively.

Figure 3:
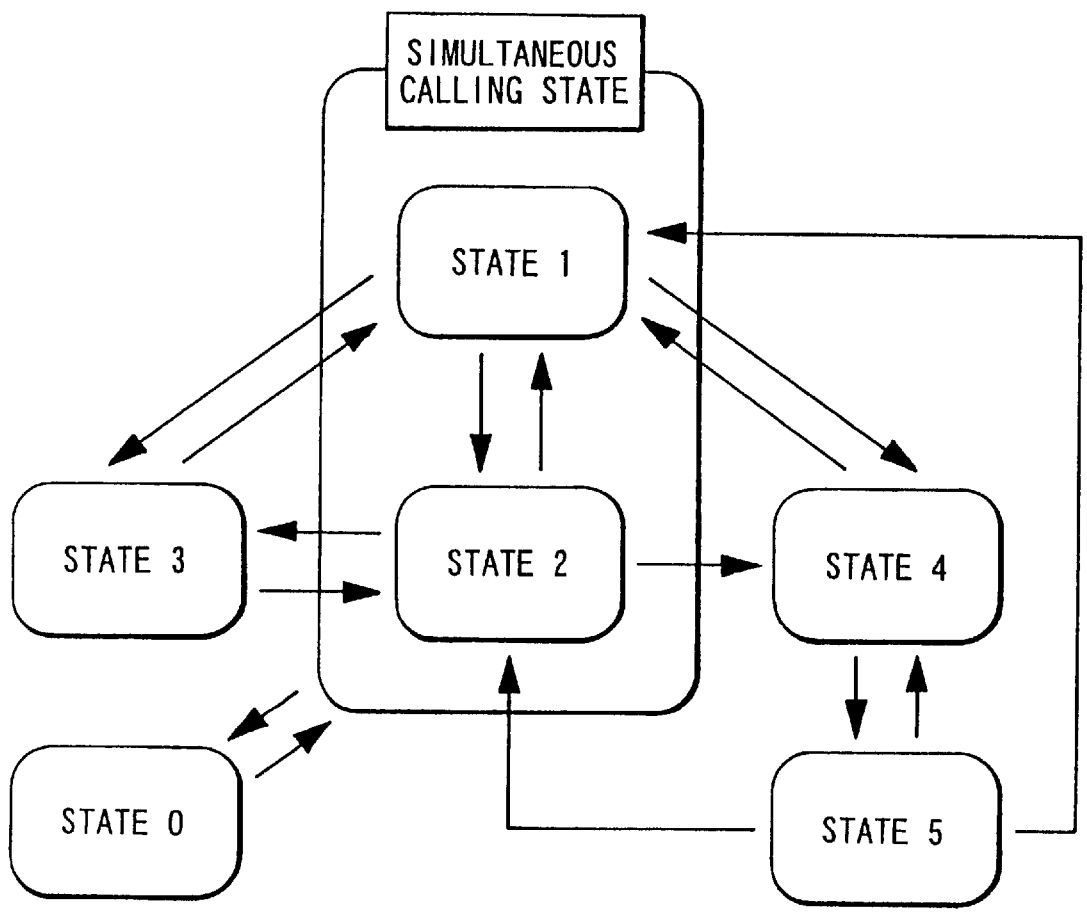
FIG. 3 is a diagram showing a relation between transition states of a communication terminal and a paging of the network system in the above-mentioned mode for carrying out the present invention.

FIG. 3 is a diagram showing a relation between transition states of a communication terminal and a paging of the network system 101 in this mode for carrying out the present invention. In this illustration, a state 0 indicates an OFF-state of power supply; a state 1, a paging standby state for voice-only; a state 2, a paging standby state for both voice and packet; a state 3, a voice communication ON-state (namely, a voice communication is undergoing); a state 4, a packet communication ON-state (namely, a packet communication is undergoing); and a state 5, a battery saving state, respectively.

Next, operation of this mode for carrying out the invention will be described.

Figure 2A:
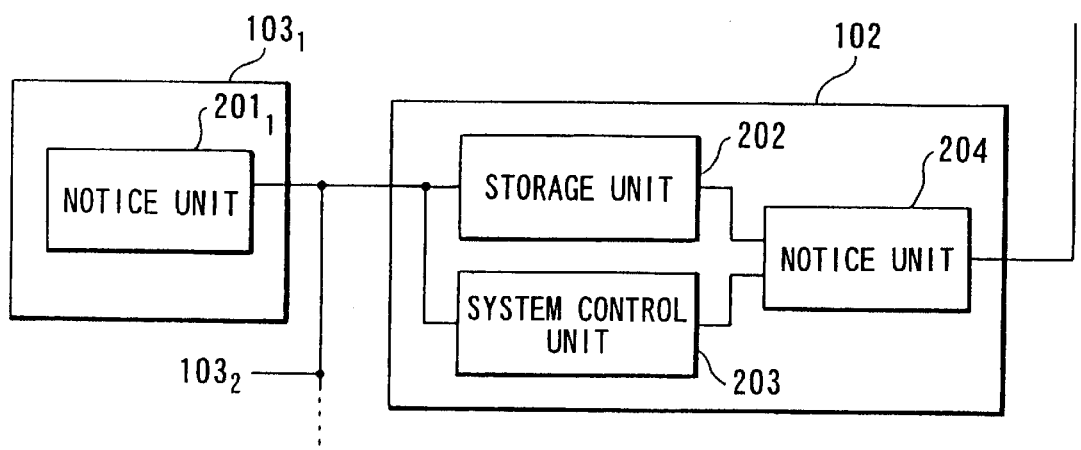
FIG. 2A is a block diagram showing a construction of a communication terminal and a data terminal in the above-mentioned mode for carrying out the present invention.

First, on the communication terminal 102 side, in FIG. 2A, the respective data terminals $103_1$ through $103_n$ notifies the communication terminal 102 through the notice unit $201_1$ through $201_n$ that a certain data terminal itself is in a usable state (for example, the power supply of the specific data terminal is in the ON-state, a communication application program is started (i.e., in the ON-state) in the specific data terminal, and the like). Then, the communication terminal 102 stores each notice in the storage unit 202. By this, the communication terminal 102 can recognize the usable state of each data terminal $103_1$ through $103_n$ from the content of the storage unit 202.

Also, a usable state of the communication terminal 102 itself (for example, this specific communication terminal is in the ON-state, a communication application program is in the ON-state) is recognized by the system control unit 203.

Since the respective data terminals are not specified, those terminals are generally denoted by 103 hereinafter.

In case it is known from the content of the storage unit 202 and the recognition of the system control unit 203 that at least one of the data terminals 103 is in the usable state and the communication terminal 102 is in the usable state, the notice unit 204 notifies the network system 101 about such a usable state at every predetermined cycle basis.

Figure 2B:
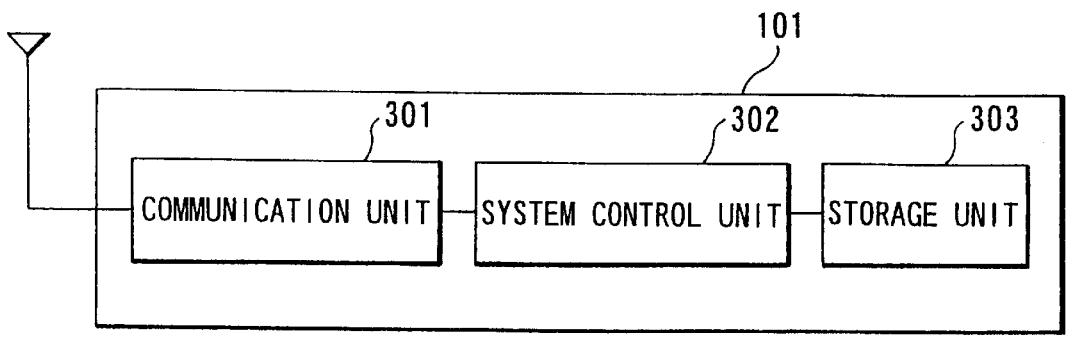
FIG. 2B is a block diagram showing a construction of a network system in the above-mentioned mode for carrying out the present invention.

On the network system 101 side, the states notified by the communication terminal 102 in FIG. 2B are cyclically received through the communication unit 301 and stores in the storage unit 303 data about the fact that the communication terminal 102 and at least one of the data terminals 103 connected to the communication terminal 102 are in the usable states.

On the other hand, in case the communication terminal 102 became unusable, or in case all the data terminals $103_1$ through $103_n$ became unusable, the communication terminal 102 does not sent the periodical notice at every predetermined cyclical basis through the notice unit 204. Accordingly, the network system 101 side can know an occurrence of such an unusable state or states by absence of such a notice within the predetermined cyclical period. Upon recognition of such a unusable state or states, the network system 101 cancels the old content of the storage unit 303, data about the fact that the communication terminal 102 is in the usable state, and deletes the specific registration.

Such registration/cancellation procedures of the communication terminal (mobile equipment) in the network system will be described later.

In case both the data terminal 103 and the communication terminal 102 are in the usable states, when a packet is received, the communication unit 301 performs a paging with respect to only the communication terminal 102 whose usable state is registered by the storage unit 303.

Here, FIG. 4 shows a possible/impossible state of a packet paging in comparison of this embodiment with the prior art. As shown in this illustration, in case the power supply of the communication terminal 102 is in the ON-state but the power supplies of the data terminals $103_1$ through $103_n$ are all in the OFF-states (those cases with a * mark in the illustration), a paging is conventionally performed without recognizing the receiving-impossible states of the data terminals and therefore, traffics are increased to that extent. However, in this embodiment, in case the mark * is attached, since the state of registration is not a usable state in the network system 101, unnecessary packet paging can be suppressed to that extent.

Also, on the network system 101 side, a state 1 (namely, a state in which voice-only can be received) and a state 2

(namely, a state in which both voice and packet simultaneous receiving standby state) of FIG. 3 are recognized as a state of the communication terminal by the system control unit 302, so that a packet paging is performed with respect to the communication terminal by the notice unit 301 only in the case of both voice and packet simultaneous standby state. Accordingly, when voice is received in the state 1, a packet paging is not performed with respect to the communication terminals.

Registration/cancellation procedures of the communication terminals in the network system 101 will now be described with reference to FIG. 5.

Figure 5:
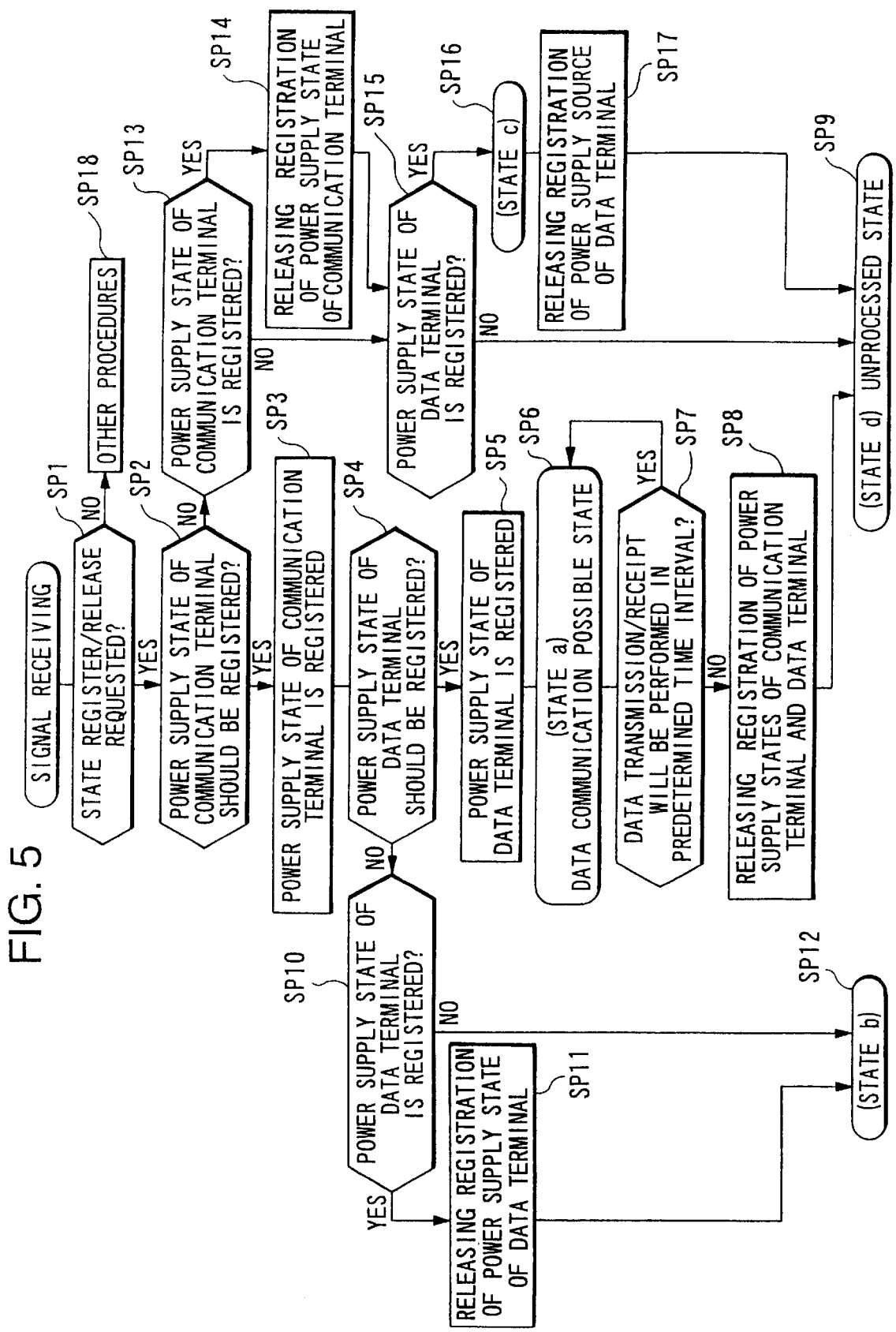
FIG. 5 is a flow chart showing operation on the side of the network of this embodiment, when a signal from a communication terminal is received.

On the network system 101 side, when the communication unit 101 receives a signal from the communication terminal 102 (or data terminal 103), it is judged in Step SP1 of FIG. 5 whether or not the content of the received signal is a request for registration/cancellation of the state. If the judgment result is "NO", on the network system 101 side, a procedure corresponding to the content of the received signal is performed in Step SP18. In contrast, if the judgment result is "YES", the process proceeds to Step SP2 where it is judged whether or not the content of the received signal is a request for registering a power supply of the communication terminal 102.

If the judgment result is "YES", the process proceeds to Step SP3 where the system control unit 302 of the network system 101 turns on the power supply of the mobile terminal 102 relating to the received signal and stores the same in the storage unit 303. Then, in Step SP4, it is also judged whether or not a state of the power supply of the data terminal 103 connected to the mobile terminal relating to the received signal should be stored.

If the judgment result is "YES", in Step SP5, by the system control unit 302 the ON-state of the power supply of the data terminal 103 is stored in the storage unit 303. In this storage state, since both the communication terminal 102 and the data terminal 103 are stored as being in ON-states, it is recognized as the state a (see FIG. 4) and set to both voice and packet simultaneous standby state. Accordingly, in the state a, when a packet is received, the communication unit 301 performs a paging with respect to the communication terminals which are in the state a.

Now, in Step SP7, the system control unit 302 judges whether or not a data transmission/reception is performed in the specific communication terminal 102 within a predetermined time interval. If the judgment result is "YES", the system control unit 302 returns the procedure to Step SP6. By this, the state a can be maintained as long as a data transmission and reception is performed within a predetermined time interval.

On the other hand, in case no data transmission and reception is performed within a predetermined time interval in Step SP6, the system control unit 302 cancels the registration or storage of the communication terminal 102 and the data terminal 103 in Step SP8. In other words, the system control unit 302 recognizes the power supplies of both the communication terminal 102 and the data terminal 103 as being in the "OFF-states" and then sets as the state d in Step SP9. If the state of the power supply of the data terminal 103 is not registered in step SP4, the system control unit 302 judges in Step SP10 whether or not the state of the power supply in the data terminal 103 is registered. If the judgment result is made in the affirmative, this registration is canceled in Step SP11, and the procedure proceeds to the next Step SP12 by recognizing the state of the power supply as being in the OFF-state. In contrast, if the judgment is made in the negative in Step SP10, the procedure proceeds directly to the next Step SP12.

In Step SP12, the system control unit 302 establishes the state b in which the power supply of the communication terminal 102 is brought to be in the ON-state and the data terminal 103 in the OFF-state. The communication unit 301 performs a voice paging with respect to the communication terminal of the state b when the voice is received.

If it is judged in Step SP2 that the state of the power supply of the communication terminal 102 should not be registered, the system control unit 302 judges in Step SP13 whether or not the state of the power supply of the specific communication terminal is stored in the storage unit 203. If the judgment result is "YES", the system control unit 302 cancels the storage or registration of the state of the power supply of the specific communication terminal in Step SP14. After the cancellation or if the judgment result of Step SP13 is "NO", the system control unit 302 judges in the next Step SP15 whether or not the state of the power supply of the data terminal connected to the communication terminal is stored in the storage unit 203. If the judgment result is "YES", the system control unit 302 sets in Step SP16 to the state c in which the state of the power supply of the communication terminal 102 is in the OFF-state and the communication terminal 103 in the ON-state.

However, in the state c, a data communication is impossible to perform as long as the communication terminal 102 having a data communication function is in the OFF-state even if one of the data terminals 103 is in the ON-state. Accordingly, the system control unit 302 proceeds the procedure immediately to the next Step SP17. That is, in Step SP 17, the registration of the state of the power supply of the data terminal 103 is forced to be canceled and recognizes the state of the power supply as "OFF-states".

After the cancellation in Step SP17 or it the judgment result of Step SP15 is "NO", in the above-mentioned Step SP9, the system control unit 302 recognizes the states of the power supplies of both of them as "OFF-states" and establishes the state d.

In this way, in this mode for carrying out the invention, in case a notice about the state of the power supply is received from the communication terminal 102, on the network system 101 side, the system control unit 302 performs registrations corresponding to the states of the power supplies of the communication terminal 102 and the data terminal 103 and stores the result in the storage unit 303. Then, as previously stated, a paging is performed based on this storage.

In the above-mentioned mode for carrying out the present invention, the registration/cancellation procedures to the storage unit 303 are performed depending on presence or absence of the cyclical notice from the notice unit 204. In the alternative, this may be performed as follows. In case at least one of the data terminals $103_1$ through $103_n$ became usable and the communication terminal 102 became usable, the notice unit 204 notifies the network 101 side to that effect at that time point. On the other hand, in case the terminal 102 became unusable, or in case all the data terminals $103_1$ through $103_n$ became unusable, the notice unit 204 also notifies the network 101 side to that effect at that time point. In the foregoing notifying procedures from the former to the latter, the registration of the specific communication terminal is performed by the storage unit 303.

We claim:

1. In a mobile data communication system in which a movable communication terminal is connected with at least one data terminal and in which a state of use of said communication terminal is independent of a state of use of said data terminal, a paging equipment in a mobile data communication system being characterized by, said communication terminal comprising:

notice means for recognizing a state of use of said communication terminal itself and a state of use of at least one data terminal and notifying a result of the recognition to a network side, said network comprising:

register means for registering said communication terminal in case said communication terminal and at least one date terminal connected to said communication terminal became usable, and deleting registration of said communication terminal in case said communication terminal or all data terminals connected to said communication terminal became unusable, in accordance with a result of said notice made by said notice means; and communication means for executing a packet paging with respect to said communication terminal registered by said register means when a data reception occurs.

2. In a mobile data communication system in which a movable communication terminal is connected with at least one data terminal and in which a state of use of said communication terminal is independent of a state of use of said data terminal, a paging method in a mobile data communication system being characterized by, said communication terminal comprising the step of:

recognizing a state of use of said communication terminal itself and a state of use of at least one data terminal and notifying a result of the recognition to a network side, said network comprising the steps of:

registering said communication terminal in case said communication terminal and at least one data terminal connected to said communication terminal became usable, and deleting the registration of said communication terminal in case said communication terminal or all data terminals connected to said communication terminal became unusable, in accordance with a result of said notice; and executing a packet paging with respect to said communication terminal which is registered, when a data reception occurs.

3. A paging equipment in a mobile data communication system according to claim 1, wherein said network further comprises:

recognizing means capable of recognizing a simultaneous standby state of voice and packet in case said communication terminal and at least on data terminal connected to said communication terminal are in the power-on state; and said communication means for executing a packet paging with respect to said communication terminal which is in said simultaneous standby state for voice and packet when the packet is received.

4. A paging equipment in a mobile data communication system according to claim 1, wherein said network further comprises:

recognizing means capable of recognizing a simultaneous standby state of voice and packet in case said communication terminal and at least one data terminal connected to said communication terminal are in the power-on state, and recognizing a voice-only standby state in case said communication terminal is in the power-on state and all data terminals connected to said communication terminal are in the power-off state; and said communication means for executing a voice paging with respect to said communication terminal which is in said voice-only standby state when the voice is received.

* * * * *